Nov. 15, 1932.  C. E. RUSH  1,887,789

POWER TRANSMISSION FOR MOWERS

Filed Dec. 15, 1931

Inventor
C. E. Rush,

By Clarence A. O'Brien
Attorney

Patented Nov. 15, 1932

1,887,789

UNITED STATES PATENT OFFICE

CLARENCE E. RUSH, OF GRAND ISLAND, NEBRASKA

POWER TRANSMISSION FOR MOWERS

Application filed December 15, 1931. Serial No. 581,261.

The present invention is disclosed in my abandoned application Serial No. 267,926, filed April 6, 1928, and also in abandoned application Serial No. 107,166, filed May 6, 1926, in which I appear as a joint inventor, and has to do with power driven mowers and contemplates the provision of a power transmission of mowers that is, at once, simple and inexpensive in construction, light in weight, and possessed of the numerous practical advantages hereinafter described to it.

With the foregoing in mind, the invention in all its details will be fully understood from the following description and claims when the same are read in connection with the drawing, accompanying and forming part of this specification, in which:

Similar numerals of reference designate corresponding parts in both views of the drawing.

Figure 1:
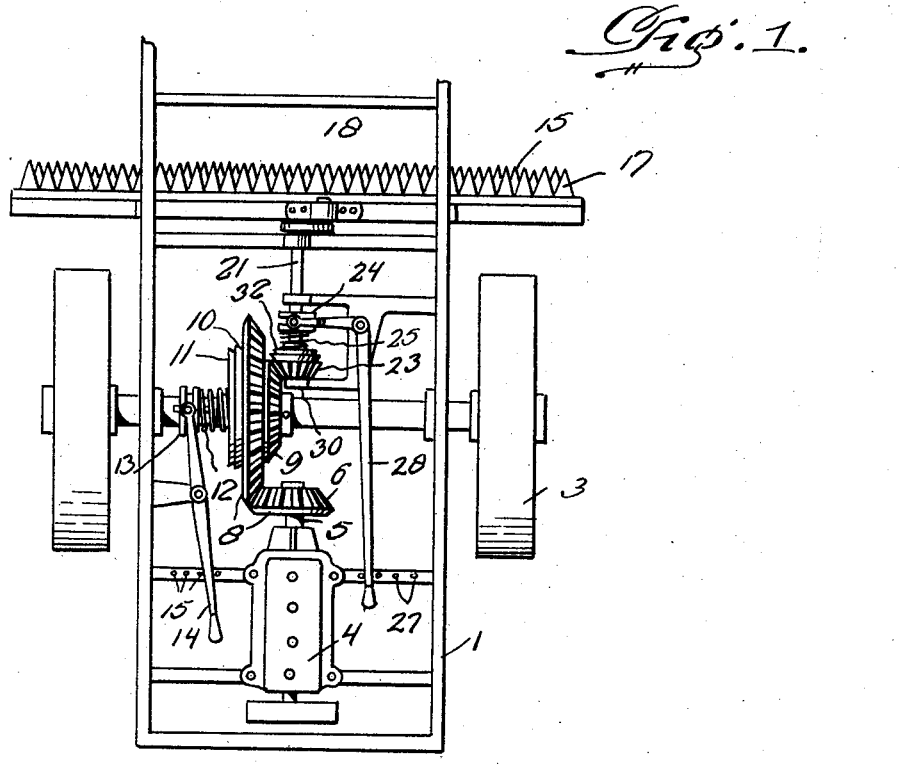
Figure 1 is a plan view illustrating the power transmission constituting the best practical embodiment of my invention of which I am aware.

In the said embodiment of my invention, a frame 1 is supported by an axle shaft 2, equipped with ground wheels 3, and the said frame 1 is utilized to carry an engine 4 of the internal combustion type, the drive shaft of the engine being designated by 5 and being equipped with a miter gear 6.

Loosely mounted on the axle shaft 2 is a unit generally designated by 7, and made up of miter gear 8 meshing with the gear 6, a smaller miter gear 9 and a friction clutch member 10, the latter being of disk formation as appears in Figure 1.

Splined, or feathered, or otherwise mounted on the axle shaft 2 so as to turn therewith and be capable of movement longitudinally thereof, is a disk clutch member 11 that is the complement of the beforementioned clutch member 10. The said clutch member 11, is backed by and is preferably connected with a spring 12 coiled about the axle shaft 2, and it will be noted that the said spring 12 is interposed between the said clutch member 11 and a disk 11x loose on shaft 2, with anti-friction balls between said disk 11x and circumferentially grooved member 13 that is also loose on shaft 2.

In engagement with the member 13 in conventional or any other appropriate manner, is one arm of a lever 14, the other arm of which is adapted to be adjustably fixed by keeper means 15 on the frame 1, it being understood in this connection that the lever 14 is of such character that it may be readily sprung into and out of engagement with the said keeper means.

Manifestly when the lever 14 is positioned as shown in Figure 1, the unit 7 will turn idly about the axle shaft 2 and hence the mower will not be moved. When, however, the rear arm of the lever 14 is swung toward the left and is secured in position to maintain the clutch member 11 in frictional contact with its complementary member 10, the unit 7 will be held to the axle shaft 2, and consequently rotation of the axle shaft 2 and the ground wheels 3 will attend rotation of the said unit 7.

Figure 2:
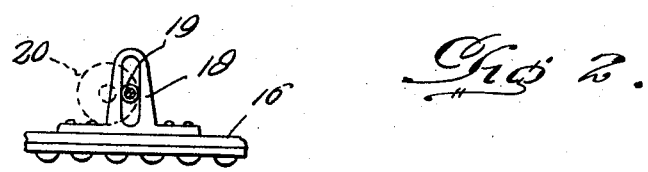
Figure 2 is a fragmentary section illustrative of the manner in which the reciprocatory cutter bar of the cutting mechanism is connected with the means for reciprocating said bar.

The cutting mechanism of the mower comprises guard fingers 15 of conventional or other appropriate character, and a knife bar 16, the said bar 16 being equipped with knife or cutting blades 17 for cooperation with the fingers 15 in the usual manner and being also provided with an open upright 18, said upright 18 being shown in elevation in Figure 2. Disposed in the said upright 18 is a pin 19 on a crank disk 20 at the forward end of a shaft 21 whereby when the said shaft 21 is rotated the bar 16 will be reciprocated. The said shaft 21 is journaled near each end in cross members of the frame 1. A disk clutch 32 is splined, feathered or otherwise mounted on the shaft 21, so as to turn therewith and be capable of endwise movement thereon. Loosely mounted on the rear end of shaft 21 is a miter gear 23 meshing with the gear 9 of unit 7. Loosely mounted on shaft 21 is a circumferentially grooved member 24 and a disk 24x, anti-friction balls being interposed between the two, and a coiled spring 25 being interposed between the miter gear 23 and the member 24.

The back of miter gear 23 is grooved and forms the component part of a disk clutch 32 against which the disk clutch 32 is pressed and frictionally held. A lever 28 is fulcrumed on the frame portion 22 and is engaged with the circumferentially grooved member 24 and is adapted to be swung into and out of engagement with keeper means 27 on the frame 1. Manifestly, when the rear arm of the lever 28 is swung toward the right, the circumferentially grooved member 24 compresses spring 25 and engaged disk clutch 32 with the back of miter gear 23, which is ground to form the component part of disk clutch 32, so that rotation of the shaft 21 will attend rotation of the before described unit 7. When, however, the rearwardly directed arm of the lever 28 is moved toward the left in Figure 1, and detachably secured in said position, the disk clutch 32 will be disengaged from the gear 23 and hence the shaft 21 and the knife bar 16 will remain idle notwithstanding the unit 7 and miter gear 23 may be rotating.

In the foregoing connection it will be understood that the miter gear 23 is loosely mounted and retained upon the shaft 21. The back of miter gear 23 is ground to form the component part of disk clutch 32.

It is only when the disk clutch 32 is held under pressure, against the back of miter gear 23 that the miter gear 23 transmits motion to the shaft 21, the gear being always in mesh with the gear 9, but the shaft 21 being only rotated by the gear 23 when the condition last described exists. From this, it follows that in the illustrated position of the lever 28, the shaft 21 will be idle, and that to bring about rotation of the shaft 21 from and by the unit 7, it is necessary for the operator to swing the rearwardly directed arm of the lever 26 outwardly and adjustably fix said arm in the outward position whereupon the clutch member 32 keyed to the shaft 21, will serve to connect the gear 23 to the shaft 21 so that said shaft 21 will be rotated when the clutch 32 is engaged with gear 23.

It will be apparent from the foregoing that the ground traction wheels 3 of the motor may be driven without actuation of the knife bar 16, and that the connection to the knife bar 16 is of such character, that there is no up and down pounding motion, and the knife bar 16 may be actuated while the traction wheels 3 are at rest. Again it will be appreciated that the mower embodying my improvement can be operated effectively to cut grass or weeds close up to a wall or other obstructions without danger of damage, and when deemed expedient, the mower may be moved very slowly without affecting the speed of the knife bar 16.

Certain of the clutch members being held in place by variable spring tensions, it follows that breakage incident to the mower encountering a stone, stake or other obstruction in its path is reduced to a minimum. Moreover certain of the clutch members may be slipped or adjusted to reduce the speed of either the ground wheels 3 of the knife bar 16.

It will further be appreciated that my improvement is materially advantageous inasmuch as it obviates the necessity of installing any driving connection other than the miter gear 6, the unit 7 and the miter gear 23.

I have specifically described the preferred embodiment of my invention in order to impart a full, clear and exact understanding of the said embodiment. I do not desire, however, to be understood as limiting myself to the precise construction and relative arrangement of the parts as disclosed, my invention being defined by appended claims within the scope of which modifications may be made without departure from my invention.

Having thus described my invention, what I claim as new is:—

1. In combination, a frame, a shaft therein, a shaft at right angles to the first named shaft and carried by the frame and equipped with a miter gear, a unit loosely mounted on the first shaft and comprising miter gears and a friction clutch member, one of the miter gears being meshed with the miter gear on the second shaft, a friction clutch member mounted on the first shaft to turn with and be capable of movements endwise of said shaft, said clutch member being spring pressed and operative controlled, a third shaft carried by the frame, a miter gear loose on said third shaft and meshed with the other miter gear of the said unit on the first shaft and having fixed to it a friction clutch member, and a friction clutch member rotatable with and movable endwise of the third shaft, said friction clutch member being spring pressed and operative controlled.

2. In combination, a frame, a shaft therein, a shaft at right angles to the first named shaft and carried by the frame and equipped with a miter gear, a unit loosely mounted on the first shaft and comprising meter gears and a friction clutch member, one of the miter gears being meshed with the miter gear on the second shaft, a friction clutch member mounted on the first shaft to turn with and be capable of movement endwise of said shaft, said clutch member being spring pressed and operative controlled, a third shaft carried by the frame, a miter gear loose on said third shaft and meshed with the other miter gear of the said unit on the first shaft and having fixed to it a friction clutch member, a friction clutch member rotatable with and movable endwise of the third shaft, said friction clutch member being spring pressed and operative controlled, and all of said friction clutch members being of flat disc-type.

In testimony whereof I affix my signature.

CLARENCE E. RUSH.